(12) United States Patent
Okada et al.

(10) Patent No.: US 10,127,460 B2
(45) Date of Patent: Nov. 13, 2018

(54) LANE BOUNDARY LINE INFORMATION ACQUIRING DEVICE

(71) Applicant: DENSO CORPORATION, Kariya, Aichi-pref. (JP)

(72) Inventors: Masaya Okada, Chirya (JP); Naoki Kawasaki, Kariya (JP); Yusuke Ueda, Okazaki (JP); Masao Oooka, Gamagori (JP); Shotaro Fukuda, Nagoya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 321 days.

(21) Appl. No.: 14/873,031

(22) Filed: Oct. 1, 2015

(65) Prior Publication Data

US 2016/0098605 A1 Apr. 7, 2016

(30) Foreign Application Priority Data

Oct. 2, 2014 (JP) .................................. 2014-203730

(51) Int. Cl.
*G06K 9/00* (2006.01)
*B60W 30/12* (2006.01)
(Continued)

(52) U.S. Cl.
CPC ......... *G06K 9/00798* (2013.01); *B60W 30/12* (2013.01); *G06K 9/6277* (2013.01); *G06K 9/4604* (2013.01)

(58) Field of Classification Search
None
See application file for complete search history.

(56) References Cited

U.S. PATENT DOCUMENTS 9,063,548 B1 * 6/2015 Ferguson ............. G05D 1/0231
2015/0278613 A1 * 10/2015 Takemae ............ G06K 9/00798
382/104

(Continued)

FOREIGN PATENT DOCUMENTS

| JP | 2005-092320 | 4/2005 |
| JP | 2008-003253 | 1/2008 |
| JP | 2014-026608 A | 2/2014 |

*Primary Examiner* — Matthew Bella
*Assistant Examiner* — Brian Shin
(74) *Attorney, Agent, or Firm* — Knobbe, Martens, Olson & Bear, LLP

(57) ABSTRACT

In a lane boundary line information acquiring device, a detection unit detects lane boundary lines. A driving environment acquiring unit acquires a driving environment. A probability information acquiring unit acquires probability information containing a probability of presence of a lane boundary line, etc. based on the detected lane boundary lines and the acquired driving environment. A position information acquiring unit acquires position information of the own vehicle. A memory unit associates the probability information with the position information of the own vehicle. Where the position information is acquired by the position information acquiring unit at a time when the probability information acquiring unit acquires the probability information, and stores the probability information associated with the position information into the memory unit. A readout unit reads out the probability information associated with the position information at a location in front of the own vehicle.

6 Claims, 7 Drawing Sheets

(51) Int. Cl.
G06K 9/62 (2006.01)
G06K 9/46 (2006.01)

(56) References Cited

U.S. PATENT DOCUMENTS

2016/0043267 A1* 2/2016 Rim ................ H01L 31/022441
　　　　　　　　　　　　　　　　　　　　136/256
2016/0046237 A1* 2/2016 Sugimoto ................ B60R 1/00
　　　　　　　　　　　　　　　　　　　　348/148

* cited by examiner

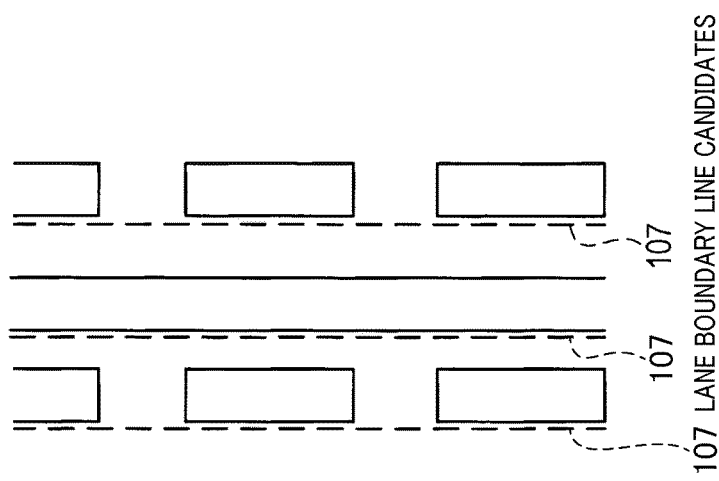
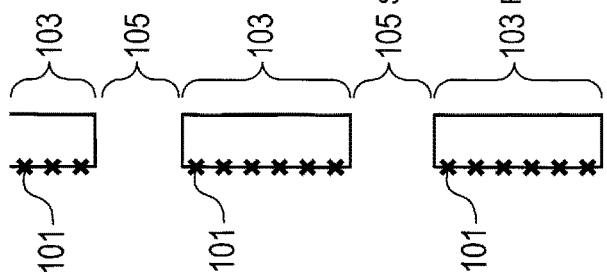
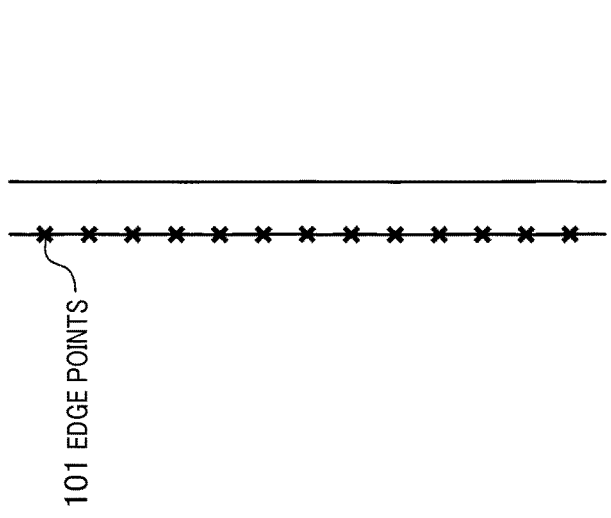

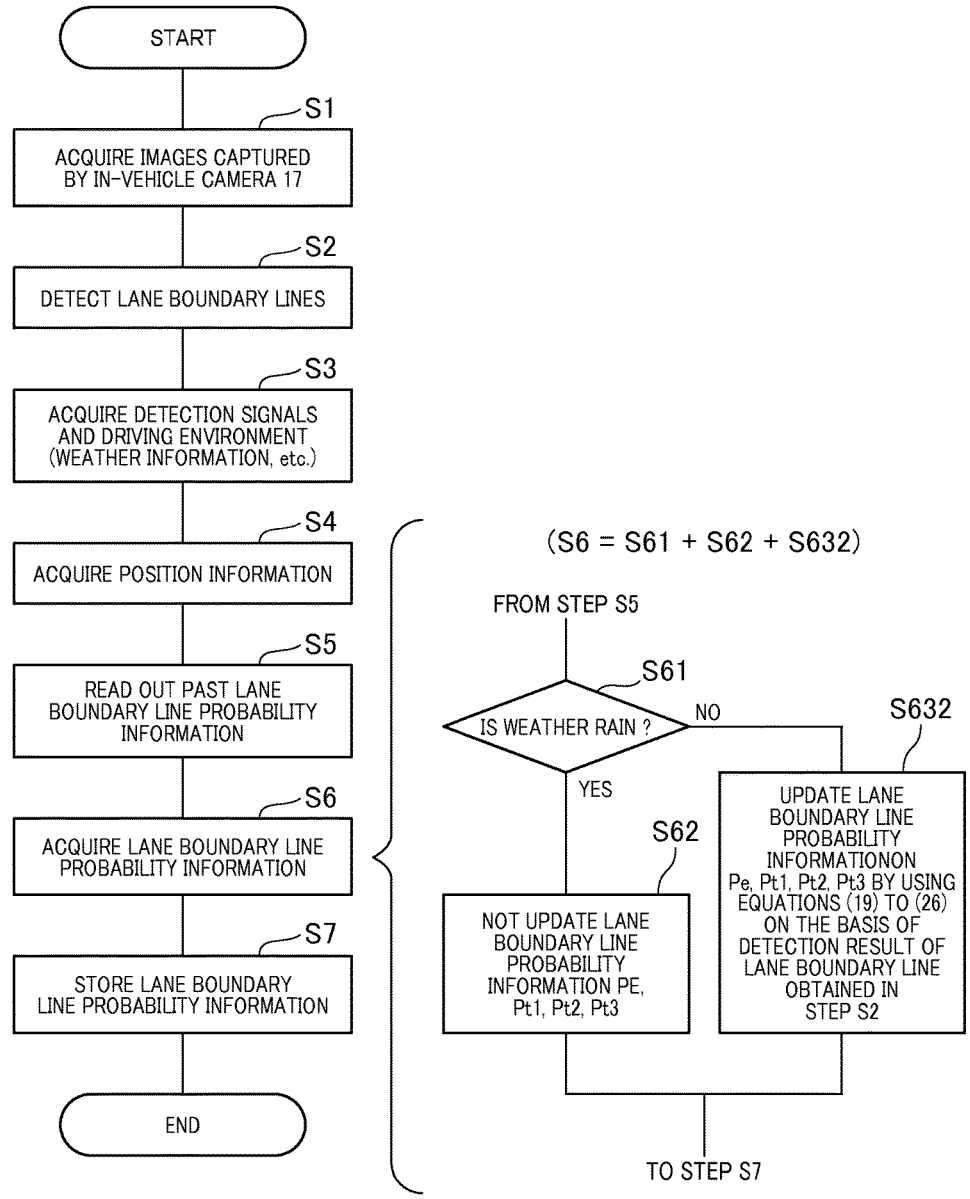

LANE BOUNDARY LINE INFORMATION ACQUIRING DEVICE

CROSS-REFERENCE TO RELATED APPLICATION

This application is related to and claims priority from Japanese Patent Application No. 2014-203730 filed on Oct. 2, 2014, the contents of which are hereby incorporated by reference.

BACKGROUND OF THE INVENTION

1. Field of the Invention

The present invention relates to lane boundary line information acquiring devices capable of correctly recognizing lane boundary lines on a roadway on which an own vehicle drives and supporting correct driving assist such as a lane keeping control and a lane departure warning even if a visibility of lane boundary lines is not reduced.

2. Description of the Related Art

Recently, there has been developed and known a technology for detecting lane boundary lines on a roadway on which an own vehicle drives on the basis of images around the own vehicle acquired by an in-vehicle camera. For example, there are white lines, Botts' dots, cat's eyes, etc. as the lane boundary lines. Such cat's eyes are retro-reflective safety devices used in road making. First, pixels having a large brightness-change in the acquired images are extracted as edge points. A trend curve passing the extracted edge points is detected as a lane boundary line on the roadway on which the own vehicle drives. The detected lane boundary line is used for performing driving assist such as lane keeping assist control (LKA control) and lane departure warning.

However, there is a possible case of it being difficult to correctly detect a lane boundary line from the images captured by the in-vehicle camera due to a road-surface condition, etc. If a control device of the own vehicle executes the lane keeping control on the basis of incorrect lane boundary line information, there is a possible case of performing an incorrect assist control of the own vehicle. In order to avoid such an incorrect assist control, a conventional technique, disclosed in a patent document 1, Japanese patent laid open publication No. 2014-26608, judges a visibility of lane boundary lines on the basis of a total number of edge points extracted from images captured during the lane boundary line detection. When the judgment result indicates the visibility is low, the control device of the own vehicle stops providing a lane departure warning to the driver of the own vehicle.

When the technique of the patent document 1 previously described is applied to the lane keeping control, it is possible to stop the execution of the lane keeping control only when the detection result indicates occurrence of a low visibility of lane boundary lines. For this reason, the control device of the own vehicle continues to execute the lane keeping control under a low visibility of lane boundary lines before the low visibility of lane boundary lines is detected.

SUMMARY

It is therefore desired to provide a lane boundary line information acquiring device capable of executing a correct assist control such as a lane keeping control and a lane departure warning even if visibility of lane boundary lines on a roadway is not always low.

An exemplary embodiment provides a lane boundary line information acquiring device having a lane boundary line detection unit, a driving environment acquiring unit, a lane boundary line probability information acquiring unit, a position information acquiring unit, a memory unit and a readout unit. The lane boundary line detection unit detects lane boundary lines. The driving environment acquiring unit acquires a driving environment of an own vehicle. The lane boundary line probability information acquiring unit acquires lane boundary line probability information containing a probability of presence of a lane boundary line or a probability of a detected lane boundary line being a specific type of lane boundary line on the basis of the detection results of the lane boundary line detection unit and the driving environment acquired by the driving environment acquiring unit. The position information acquiring unit acquires position information of the own vehicle. The memory unit associates the lane boundary line probability information with the position information of the own vehicle. The position information of the own vehicle is acquired by the position information acquiring unit at a time when the lane boundary line probability information acquiring unit acquires the lane boundary line probability information. The position information acquiring unit stores the lane boundary line probability information associated with the position information of the own vehicle into the memory unit. The readout unit reads out the lane boundary line probability information associated with the position information at a location in front of the own vehicle.

That is, the lane boundary line information acquiring device according to the present invention reads out the lane boundary line probability information associated with the position information at a location in front of the own vehicle, which has been stored in the memory unit. Accordingly, it is possible for the lane boundary line information acquiring device to execute on the basis of the readout lane boundary line probability information correct vehicle control, for example, a correct start, continuation and stop of the vehicle control (such as a lane keeping control, a lane departure warning) using lane boundary lines on the roadway on which the own vehicle drives.

Even if a visibility of lane boundary lines is not always reduced at the current location of the own vehicle, it is possible to execute the correct vehicle control on the basis of the readout lane boundary line probability information.

BRIEF DESCRIPTION OF THE DRAWINGS

A preferred, non-limiting embodiment of the present invention will be described by way of example with reference to the accompanying drawings, in which:

FIG. 3A is a view explaining an arrangement of edge points 101 on a solid lane boundary line on a roadway;

FIG. 3B is a view explaining an arrangement of edge points 101 on a dotted lane boundary line on a roadway;

FIG. 3C is a view explaining an arrangement of lane boundary line candidates 107 as a mixed lane boundary line on a roadway;

FIG. 7 is a flow chart showing a lane boundary line probability information storing process executed by the lane boundary line information acquiring device according to a fourth exemplary embodiment of the present invention.

DETAILED DESCRIPTION OF THE PREFERRED EMBODIMENTS

Figure 1:
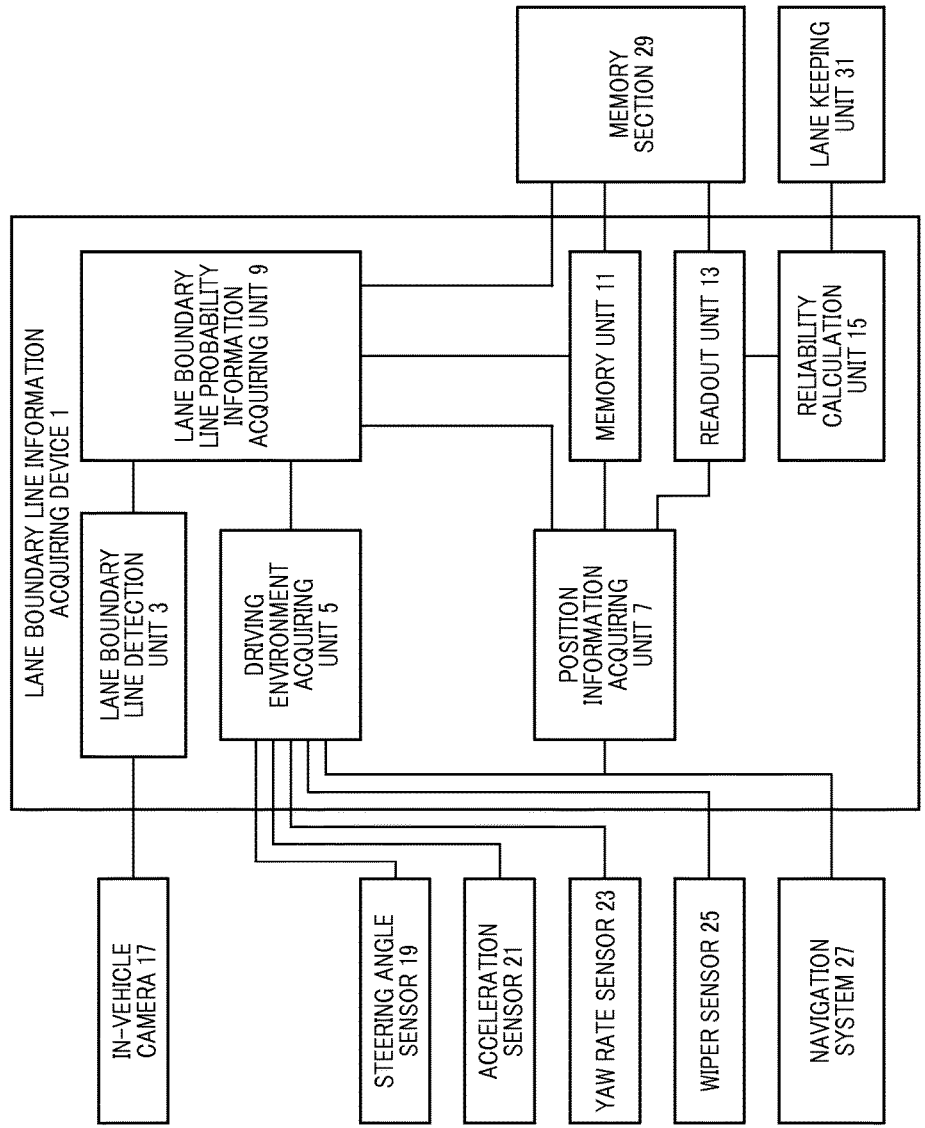
FIG. 1 is a block diagram showing a structure of a lane boundary line information acquiring device according to a first exemplary embodiment of the present invention.

Hereinafter, various embodiments of the present invention will be described with reference to the accompanying drawings. In the following description of the various embodiments, like reference characters or numerals designate like or equivalent component parts throughout the several diagrams.

First Exemplary Embodiment

A description will be given of a lane boundary line information acquiring device 1 according to a first exemplary embodiment with reference to FIG. 1 to FIG. 4.

1. Structure of the Lane Boundary Line Information Acquiring Device 1

A description will now be given of the lane boundary line information acquiring device 1 according to the first exemplary embodiment with reference to FIG. 1.

FIG. 1 is a block diagram showing a structure of the lane boundary line information acquiring device 1 according to the first exemplary embodiment. The lane boundary line information acquiring device 1 is mounted to an own vehicle.

The lane boundary line information acquiring device 1 consists of a computer equipped with a central processing unit (CPU), a random access memory (RAM), a read only memory (ROM), etc. Programs are stored in advance into the memory such as the ROM. The lane boundary line information acquiring device 1 is equipped with functional units, i.e. a lane boundary line detection unit 3, a driving environment acquiring unit 5, a position information acquiring unit 7, a lane boundary line probability information acquiring unit 9, a memory unit 11, a readout unit 13 and a reliability calculation unit 15. The process executed by each of the units will be described later.

The own vehicle is equipped with an in-vehicle camera 17, a steering angle sensor 19, an acceleration sensor 21, a yaw rate sensor 23, a wiper sensor 25, a navigation system 27, a memory section 29, and a lane keeping unit 31, in addition to the lane boundary line information acquiring device 1.

The in-vehicle camera 17 captures a scene image of an area in front of the own vehicle. The in-vehicle camera 17 transmits the captured image data to the lane boundary line detection unit 3. The image data captured by the in-vehicle camera 17 contains road surface data in front of the own vehicle.

The steering angle sensor 19 detects a steering angle of the own vehicle, and transmits the detection results to the driving environment acquiring unit 5. The acceleration sensor 21 detects an acceleration of the own vehicle and transmits the detection results to the driving environment acquiring unit 5. The yaw rate sensor 23 detects a yaw rate of the own vehicle and transmits the detection results to the driving environment acquiring unit 5. The wiper sensor 25 detects a motion of the wipers of the own vehicle and transmits the detection results to the driving environment acquiring unit 5.

The navigation system 27 is equipped with a global positioning system (GPS). The navigation system 27 acquires position information of the own vehicle and transmits the position information to the position information acquiring unit 7. The navigation system 27 is equipped with a communication unit capable of communicating with external devices. The navigation system 27 acquires weather information (for example, sunny (fine) or cloudy) at the location of the own vehicle transmitted from the external devices. The navigation system 27 transmits the obtained weather information to the driving environment acquiring unit 5.

The memory section 29 consists of a hard disk drive (HDD) capable of storing information and fetching the information.

The lane keeping unit 31 performs a lane keeping control for automatically keeping the own vehicle within an own lane on the roadway on which the own vehicle drives. That is, the lane keeping unit 31 acquires a position and angle of the own vehicle to the lane boundary lines arranged at both sides of the own lane on which the own vehicle is running. The lane keeping unit 31 performs the automatic steering control, etc. to prevent the own vehicle from departing the own lane. Further, the lane keeping unit 31 provides warning to the driver of the own vehicle when there is a possible danger of the own vehicle to departing from the own lane.

The lane keeping unit 31 executes the lane keeping control on the basis of the lane boundary lines detected by the lane boundary line detection unit 3.

2. Lane Boundary Line Probability Information Storing Process Performed by the Lane Boundary Line Information Acquiring Device 1 According to the First Exemplary Embodiment A description will now be given of the lane boundary line probability information storing process performed by the lane boundary line information acquiring device 1.

Figure 2:
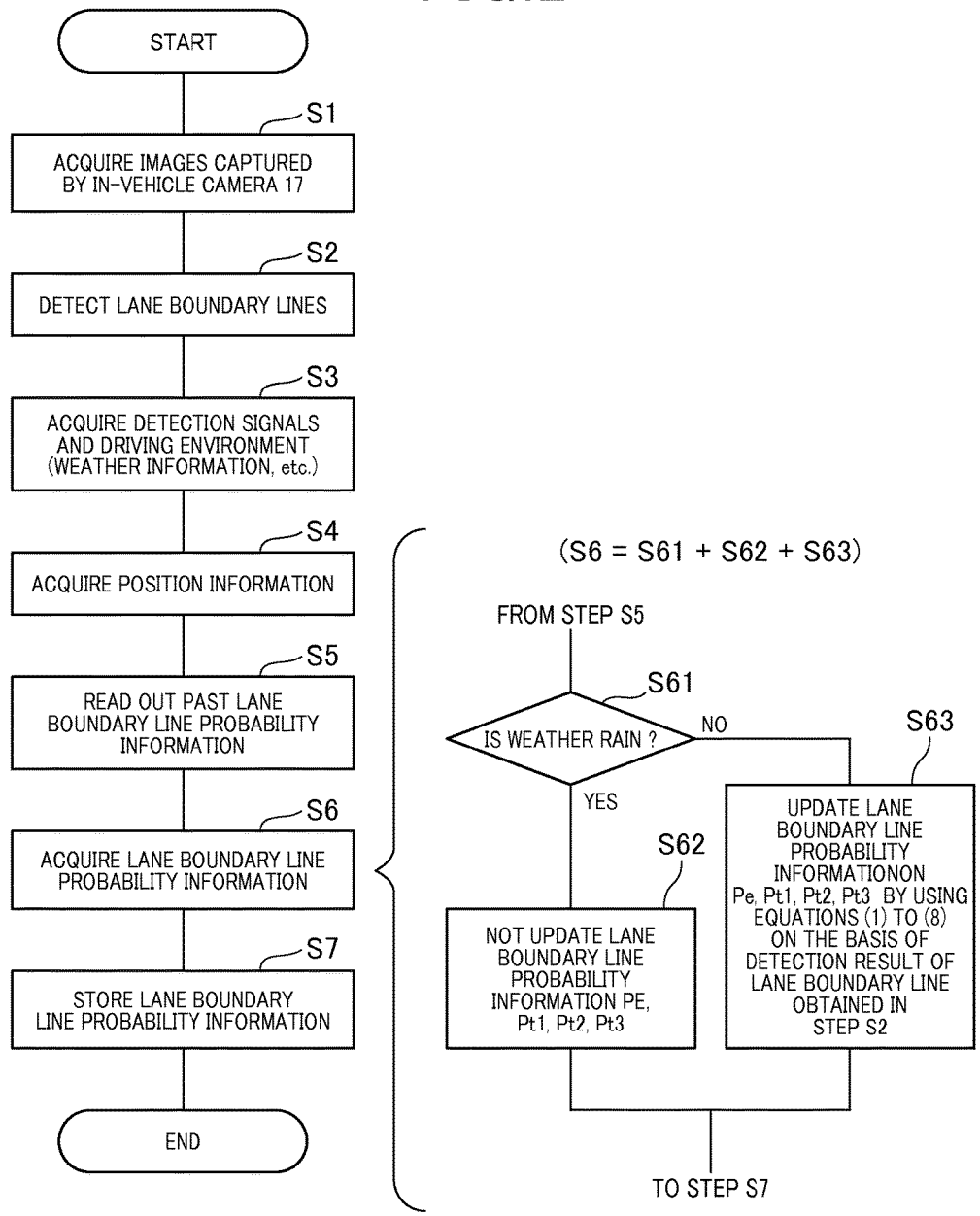
FIG. 2 is a flow chart showing a lane boundary line probability information storing process executed by the lane boundary line information acquiring device according to the first exemplary embodiment of the present invention.

FIG. 2 is a flow chart showing the lane boundary line probability information storing process executed by the lane boundary line information acquiring device 1 according to the first exemplary embodiment. FIG. 3A is a view explaining an arrangement of edge points 101 on a solid lane boundary line on a roadway. FIG. 3B is a view explaining an arrangement of edge points 101 on a dotted lane boundary line on a roadway. FIG. 3C is a view explaining an arrangement of lane boundary line candidates 107 as a mixed lane boundary line on a roadway.

The lane boundary line information acquiring device 1 repeatedly performs the process shown in FIG. 2 when the own vehicle is running.

In step S1, the lane boundary line detection unit 3 captures images of an area in front of the own vehicle captured by the in-vehicle camera 17. The captured images contain road surface images on the road way in front of the own vehicle. The operation flow proceeds to step S2.

In step S2, the lane boundary line detection unit 3 uses a known method of detecting lane boundary lines from the images obtained in step S1. Specifically, the lane boundary line detection unit 3 extracts edge points having a large brightness change from the images. The lane boundary line detection unit 3 provides a trend curve tracing or passing the extracted edge points and uses the trend curve as a lane boundary line candidate. Next, the lane boundary line detection unit 3 selects the lane boundary line from the lane boundary line candidates on the basis of the brightness and patterns of the lane boundary line candidates.

Further, in step S2, the lane boundary line detection unit 3 detects a type of the lane boundary line. That is, as shown in FIG. 3A, when the extracted edge points 101 are arranged continuously at a constant interval without having a feature of a mixed lane boundary line (which will be explained later), the lane boundary line detection unit 3 judges that the detected lane boundary line is a solid lane boundary line which is a lane boundary line running along a forward direction of the roadway without being interrupted.

Still further, as shown in FIG. 3B, when a first section 103 and a second section 105 are alternately arranged and without having a feature of a mixed lane boundary line (which will be explained later), the lane boundary line detection unit 3 judges that the detected lane boundary line is a dotted lane boundary line, where in the first section 103 the edge points 101 extracted during the lane boundary line detection process in step S2 are arranged closely, and in the second section 105 few edge points are arranged.

Still further, as shown in FIG. 3C, when the number of the lane boundary line candidates 107 in a predetermined width on the roadway is not less than a predetermined number, the lane boundary line belongs to the mixed lane boundary line, where the lane boundary line candidates 107 has been generated during the lane boundary line detection process. In this case, the lane boundary line detection unit 3 judges that the detected lane boundary line is the mixed lane boundary line. The operation flow proceeds to step S3.

In step S3, the driving environment acquiring unit 5 receives a detection signal transmitted from the wiper sensor 25, where the detection signal indicates the motion of the wipers of the own vehicle. The driving environment acquiring unit 5 further receives weather information at the current location of the own vehicle transmitted from the navigation system 27.

The driving environment acquiring unit 5 judges a state of the weather at the current location of the own vehicle on the basis of these received information. That is, when the detection signal transmitted from the wiper sensor 35 indicates the movement of the wipers of the own vehicle, the driving environment acquiring unit 5 judges that the weather of the current location of the own vehicle is rain. On the other hand, when the detection signal transmitted from the wiper sensor 35 does not indicate the movement of the wipers of the own vehicle, the driving environment acquiring unit 5 judges that the weather of the current location of the own vehicle is not rain (i.e. the weather is fine or cloudy).

When the judgment result in step S3 indicates that it is not raining at the current location of the own vehicle, the driving environment acquiring unit 5 judges whether or not the weather is fine or cloudy on the basis of the weather information obtained from the navigation system 27. The weather at the current location of the own vehicle is one of the drive information of the own vehicle. That is, the drive information of the own vehicle indicates an environment of the own vehicle or its surrounding area. There are various conditions which affect a detection reliability of the lane boundary lines. For example, one drive condition affects a detection accuracy of the lane boundary lines which has been obtained from the images acquired by the in-vehicle camera 17. There are, as the driving environment, weather and vehicle conditions such as a steering angle speed, acceleration speed, yaw rate, etc. The operation flow proceeds to step S4.

In step S4, the position information acquiring unit 7 obtains position information of the own vehicle transmitted from the navigation system 27. The operation flow proceeds to step S5.

In step S5, the lane boundary line probability information acquiring unit 9 reads out lane boundary line probability information stored in the memory section 29. The lane boundary line probability information and position information has been associated together and stored in the memory section 29. That is, the lane boundary line probability information obtained in step S5 has been associated with the position information of the own vehicle obtained in step S4.

The lane boundary line probability information contains the following data items:

Probability Pe: Probability of presence of a lane boundary line at a location indicated by the associated position information;

Probability Pt1: Probability that a type of the lane boundary line is a solid lane boundary line;

Probability Pt2: Probability that a type of the lane boundary line is a dotted lane boundary line; and Probability Pt3: Probability that a type of the lane boundary line is a mixed lane boundary line.

The lane boundary line probability information previously described has been stored in the memory section during a past process in step S7. The process in step S7 will be explained later.

These probabilities Pt1, Pt2 and Pt3 are examples when the lane boundary line is one of not less than two specific types. Each of the probabilities Pe, Pt1, Pt2 and Pt3 has a value within a range of 0 to 1.

When there is no data in the memory section 29, which has been associated with the position information of the own vehicle obtained in step S4, it is possible to use default data as the lane boundary line probability information. That is, such default data regarding the lane boundary line probability information contains default data items as the probability Pe, the probability Pt1, the probability Pt2, and the probability Pt3.

Further, when there is no data in the memory section 29 which is associated with the position information of the own vehicle obtained in step S4, it is possible to generate new lane boundary line probability information without using any past lane boundary line probability information, like in a case of non-rainy weather, to be performed in the fourth exemplary embodiment which will be explained later.

In step S6 shown in FIG. 2, the lane boundary line probability information acquiring unit 9 obtains the lane boundary line probability information on the basis of the detection result of the lane boundary line in step S2 and the driving environment acquired in step S3. As shown in FIG. 2, step S6 consists of step S61, step S62 and step S63.

In more detail, the lane boundary line probability information acquiring unit 9 updates the past lane boundary line probability information fetched in step S5 on the basis of the detection result of the lane boundary line in step S2 and the driving environment acquired in step S3. That is, the lane boundary line probability information acquiring unit 9 obtains the new lane boundary line probability information (step S6).

Specifically, the lane boundary line probability information acquiring unit 9 does not update the probability Pe, the probability Pt1, the probability Pt2, and the probability Pt3 in step S62 when the detection result in step S3 indicates the weather at the current location of the own vehicle is rain ("YES" in step S61). That is, the lane boundary line probability information acquiring unit 9 uses as new probabilities Pe, Pt1, Pt2 and Pt3, the past data, i.e. the probability Pe, the probability Pt1, the probability Pt2, and the probability Pt3 which has been read out in step S5. The rainy weather is one example to reduce a degree of reliability of the detection result of the lane boundary line in step S2.

On the other hand, if the weather at the current location of the own vehicle obtained in step S3 is not rain ("NO" in step S61), the lane boundary line probability information acquiring unit 9 updates in step S63 the past probabilities Pe, Pt1, Pt2 and Pt3 obtained in step S3 on the basis of the detection results of lane boundary lines in step S2.

Specifically, in step S63, when the process in step S2 has detected a lane boundary line, the probability Pe is updated by using the following equation (1). On the other hand, when the process in step S2 does not detect a lane boundary line, the probability Pe is updated by using the following equation (2).

The equations (1) to (8) are as follows:

$$Pe=Pe+a \quad (1),$$

$$Pe=Pe-a \quad (2),$$

$$Pt1=Pt1+a \quad (3),$$

$$Pt1=Pt1-a \quad (4),$$

$$Pt2=Pt2+a \quad (5),$$

$$Pt2=Pt2-a \quad (6),$$

$$Pt3=Pt3+a \quad (7), \text{ and}$$

$$Pt3=Pt3-a \quad (8),$$

where the reference character a indicates a probability varying width which is a positive constant value.

In addition, when a solid lane boundary line has been detected in step S2, the probability Pt1 is updated by using the equation (3) in step S63. On the other hand, when no solid lane boundary line has been detected in step S2, the probability Pt1 is updated by using the equation (4) in step S63.

Further, in step S63, when a dotted lane boundary line has been detected in step S2, the probability Pt2 is updated by using the equation (5). On the other hand, when no dotted lane boundary line has been detected in step S2, the probability Pt2 is updated by using the equation (6).

Still further, in step S63, when a mixed lane boundary line has been detected in step S2, the probability Pt3 is updated by using the equation (7). On the other hand, when no mixed lane boundary line has been detected in step S2, the probability Pt3 is updated by using the equation (8). The operation flow proceeds to step S7.

In step S7 shown in FIG. 2, the memory unit 11 stores into the memory section 29 the new lane boundary line information obtained in step 6 which has been associated with the position information of the own vehicle obtained in step S4.

3. Reliability Calculation Process Executed by the Lane Boundary Line Information Acquiring Device 1 According to the First Exemplary Embodiment A description will now be given of the reliability calculation process with reference to FIG. 4.

Figure 4:
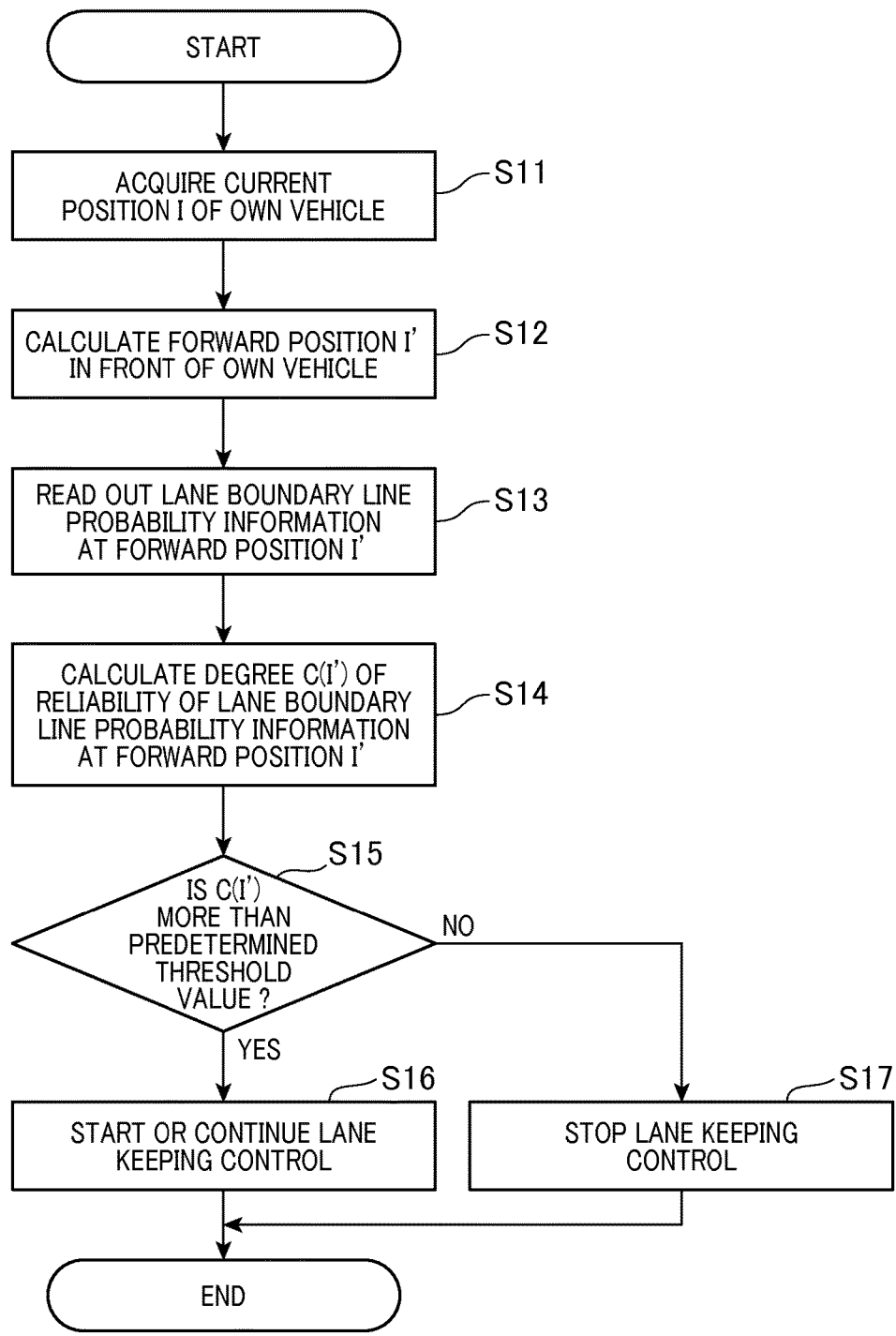
FIG. 4 is a flow chart showing a reliability calculation process executed by the lane boundary line information acquiring device according to the first exemplary embodiment of the present invention.

FIG. 4 is a flow chart showing the reliability calculation process executed by the lane boundary line information acquiring device 1 according to the first exemplary embodiment.

The lane boundary line information acquiring device 1 executes repeatedly the process shown in FIG. 4 at predetermined interval when the own vehicle is running.

In step S11, the position information acquiring unit 7 acquires a current position I of the own vehicle on the roadway by using the navigation system 27. The operation flow proceeds to step S12.

In step S12, the position information acquiring unit 7 calculates a position I' ahead of the own vehicle on the roadway after the elapse of t seconds. This position I' ahead of the own vehicle is a position which is away from the current position of the own vehicle acquired in step S11 by a moving distance d of the own vehicle after t seconds later. It is possible to calculate this moving distance d by multiplying a current speed v (m/sec) of the own vehicle by the value t. The operation flow proceeds to step S13.

In step S13, the readout unit 13 reads out from the memory section 29 the lane boundary line probability information which has been associated with the position I' ahead of the own vehicle calculated in step S12. The operation flow proceeds to step S14.

In step S14, the reliability calculation unit 15 calculates a degree C. (I') of reliability at the position I' in front of or ahead of the own vehicle. The degree C. (I') of reliability at the position I' ahead of the own vehicle can be calculated by the following equations (9) and (10).

When the probability Pe involved in the readout lane boundary line probability information obtained in step S13 is less than 0.5 (50%), the degree C. (I') of reliability is calculated by using the equation (9) to become zero.

$$C(I')=0, \quad (9).$$

On the other hand, when the probability Pe involved in the readout lane boundary line probability information obtain in step S13 is not less than 0.5 (50% or more), the degree C. (I') of reliability is calculated by using the equation (10).

$$C(I')=(w1*Pt1)+(w2*Pt2)+(w3*Pt3), \quad (10),$$

where each of variables w1, w2, w3 is a constant corresponding to a type of lane boundary lines. The variables w1 and w2 are positive number, and the variable w3 is a negative number. The variable w1 is larger than the variable w2. The degree C. (I') of reliability indicates a reliability of presence of a lane boundary line (a solid lane boundary line, a dotted lane boundary line, etc.), to be used for executing the lane keeping control, at the position I' ahead of the own vehicle. The operation flow proceeds to step S15.

In step S15, the reliability calculation unit 15 detects whether or not the degree C. (I') of reliability calculated in step S14 is larger than a predetermined threshold value. When the detection result in step S15 indicates affirmation ("YES" in step S15), the operation flow proceeds to step S16. On the other hand, when the detection result in step S15 indicates negation ("NO" in step S15), i.e. indicates that the degree C. (I') of reliability calculated in step S14 is not more than the predetermined threshold value, the operation flow proceeds to step S17.

In step S16, the reliability calculation unit 15 instructs the lane keeping unit 31 to start the lane keeping control. When the lane keeping control has been performed, the reliability calculation unit 15 instructs the lane keeping unit 31 to continue the lane keeping control.

In step S17, the reliability calculation unit 15 instructs the lane keeping unit 31 to halt the execution of the lane keeping control. When the lane keeping control has not been performed, the reliability calculation unit 15 instructs the lane keeping unit 31 to maintain the temporal stop of the lane keeping control.

4. Effects Provided by the Lane Boundary Line Information Acquiring Device 1 According to the First Exemplary Embodiment (1A) The lane boundary line information acquiring device 1 reads out the lane boundary line probability information which has been associated with the position I' ahead of the own vehicle and stored in the memory section 29. The lane boundary line information acquiring device 1 calculates the degree C. (I') of reliability at the position I' ahead of the own vehicle on the basis of the obtained lane boundary line probability information.

For this reason, even if the visibility of the lane boundary line obtained from images captured by the in-vehicle camera 17 is not always reduced, the lane boundary line information acquiring device 1 can calculate the degree C. (I') of reliability at the position I' ahead of the own vehicle, and performs the correct judgment to start the lane keeping control, continue the lane keeping control and halt the lane keeping control on the basis of the calculated degree C. (I') of reliability.

(1B) The lane boundary line information acquiring device 1 can update the lane boundary line probability information on the basis of the detection result of the lane boundary line detection unit 3. For this reason, it is possible to increase the accuracy of the lane boundary line probability information.

(1C) When updating the lane boundary line probability information, the lane boundary line information acquiring device 1 switches the type to update the lane boundary line probability information in accordance with the driving environment of the roadway on which the own vehicle drives. That is, when the driving environment reduces the reliability of the detection result of the lane boundary line obtained by the lane boundary line detection unit 3 (for example, the reliability of the detection result of the lane boundary line is reduced when the weather is rain), the lane boundary line information acquiring device 1 stops updating the lane boundary line probability information. This makes it possible to suppress unnecessary updating of the lane boundary line probability information.

(1D) The lane boundary line information acquiring device 1 acquires the probability Pe, the probability Pt1, the probability Pt2, and the probability Pt3, and calculates the degree C. (I') of reliability of a lane boundary line at a forward position ahead the own vehicle on the basis of the acquired probabilities. For this reason, it is possible for the lane boundary line information acquiring device 1 to calculate the correct degree C. (I') of reliability of a lane boundary line at the position I' ahead of the own vehicle.

Second Exemplary Embodiment

A description will be given of the lane boundary line information acquiring device 1 according to a second exemplary embodiment with reference to FIG. 5.

1. Structure of the Lane Boundary Line Information Acquiring Device 1 According to the Second Exemplary Embodiment The lane boundary line information acquiring device 1 according to the second exemplary embodiment has the same structure as the lane boundary line information acquiring device 1 according to the first exemplary embodiment. Accordingly, the explanation of the structure of the lane boundary line information acquiring device 1 according to the second exemplary embodiment is omitted here.

2. Lane Boundary Line Probability Information Storing Process Performed by the Lane Boundary Line Information Acquiring Device 1 According to the Second Exemplary Embodiment FIG. 5 is a flow chart showing the lane boundary line probability information storing process executed by the lane boundary line information acquiring device according to the second exemplary embodiment.

The lane boundary line probability information storing process executed by the lane boundary line information acquiring device 1 according to the second exemplary embodiment is basically the same of that of the lane boundary line information acquiring device 1 according to the first exemplary embodiment. The difference between the second exemplary embodiment and the first exemplary embodiment will be explained.

In the lane boundary line probability information storing process executed by the lane boundary line information acquiring device 1 according to the second exemplary embodiment, the driving environment acquiring unit 5 further acquires a steering angle speed of the own vehicle in addition to the weather information at the current location of the own vehicle in step S3-1. This steering angle speed of the own vehicle is a change amount of the steering angle per unit time. The driving environment acquiring unit 5 calculates the steering angle speed on the basis of the steering angle repeatedly transmitted every predetermined time interval from the steering angle sensor 19. The weather information and steering angle speed at the location of the own vehicle are examples of the driving environment. The steering angle speed is also an example of the vehicle condition.

In the lane boundary line probability information storing process executed by the lane boundary line information acquiring device 1 according to the second exemplary embodiment, the lane boundary line probability information acquiring unit 9 acquires the new lane boundary line probability information by the following process in step S6. Step 6 consists of step S61, step S62 and step S63 as shown in FIG. 5.

The lane boundary line probability information acquiring unit 9 does not update the probability Pe, the probability Pt1, the probability Pt2, and the probability Pt3 in step S62 when the weather of the current location of the own vehicle obtained in step S3-1 is rain or the steering angle speed is not less than a predetermined threshold value ("YES" in step S61). In this case, the lane boundary line probability information acquiring unit 9 uses the probability Pe, the probability Pt1, the probability Pt2, and the probability Pt3 obtained in step S5 as new probability Pe, new probability Pt1, new probability Pt2, and new probability Pt3 without updating them. The rain weather and the steering angle speed of not less than the predetermined threshold value are examples of reducing the reliability of the detection result of the lane boundary line obtained in step S2.

Figure 5:
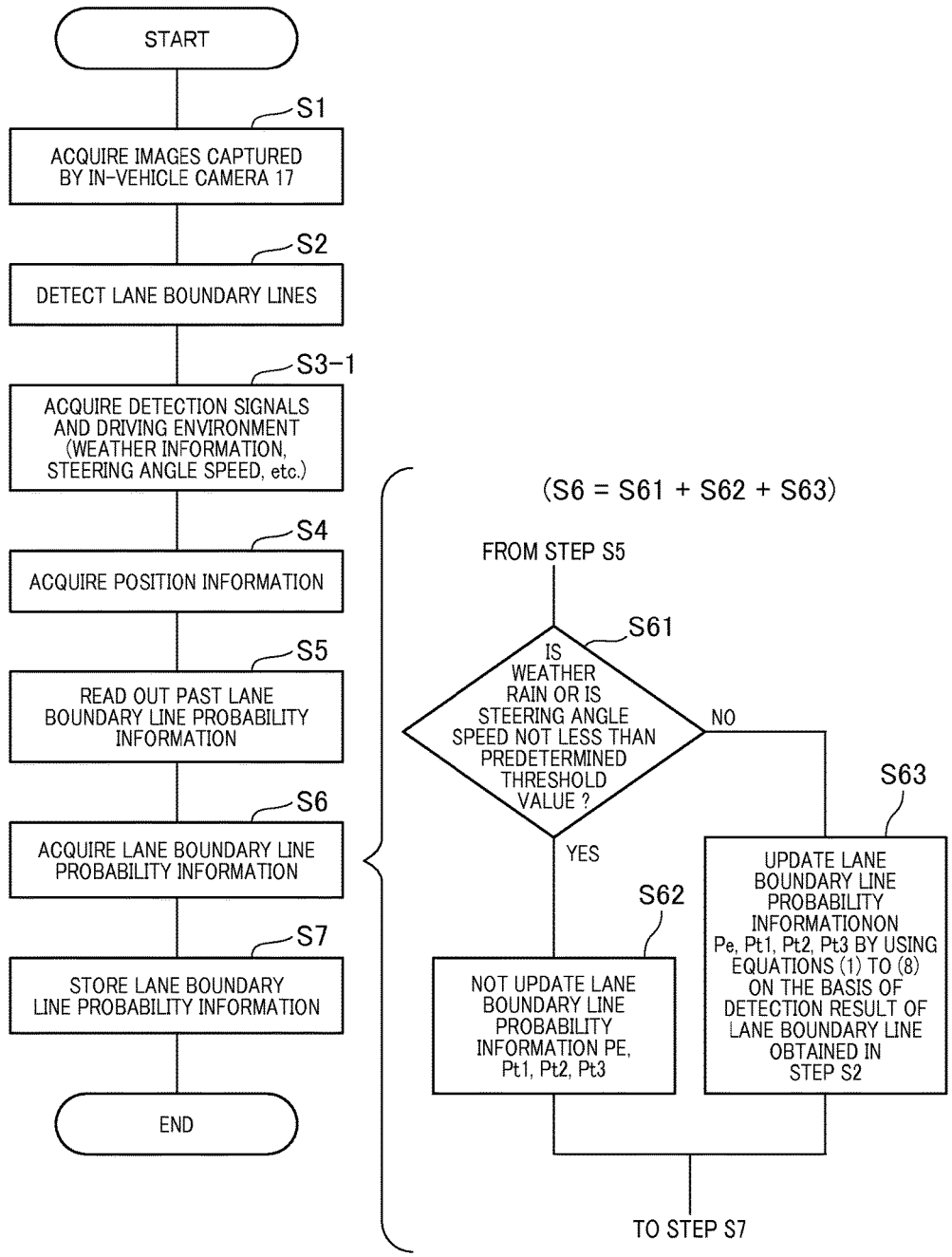
FIG. 5 is a flow chart showing a lane boundary line probability information storing process executed by the lane boundary line information acquiring device according to a second exemplary embodiment of the present invention.

On the other hand, in step S63 shown in FIG. 5, the lane boundary line probability information acquiring unit 9 updates the probability Pe, the probability Pt1, the probability Pt2, and the probability Pt3 when the weather of the current location of the own vehicle obtained in step S3-1 is not rain and the steering angle speed is less than the predetermined threshold value ("NO" in step S61).

3. Reliability Calculation Process Executed by the Lane Boundary Line Information Acquiring Device 1 According to the Second Exemplary Embodiment The lane boundary line information acquiring device 1 according to the second exemplary embodiment executes the same process regarding the reliability calculation process performed by the lane boundary line information acquiring device 1 according to the first exemplary embodiment. Therefore the explanation of the process is omitted here.

4. Effects Provided by the Lane Boundary Line Information Acquiring Device 1 According to the Second Exemplary Embodiment In addition to the effects (1A) to (1D) of the lane boundary line information acquiring device 1 according to the first exemplary embodiment previously described, the lane boundary line information acquiring device 1 according to the second exemplary embodiment has the following effects. That is, because the lane boundary line probability information are updated while considering a steering angle speed of the own vehicle in addition to weather information, it is possible to obtain the correct lane boundary line probability information.

Third Exemplary Embodiment

A description will be given of the lane boundary line information acquiring device 1 according to a third exemplary embodiment with reference to FIG. 6.

Figure 6:
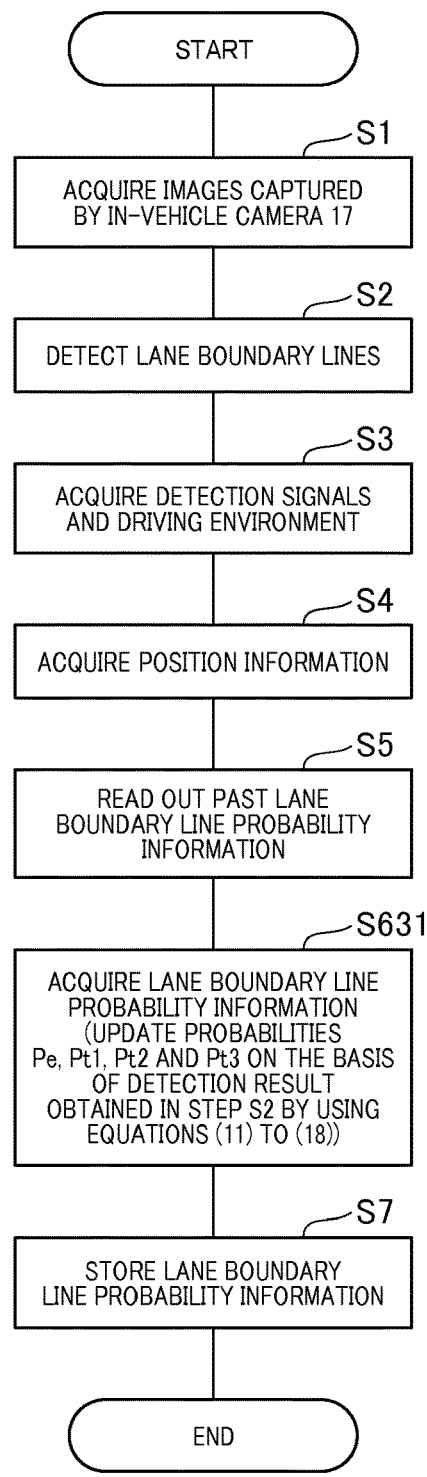
FIG. 6 is a flow chart showing a lane boundary line probability information storing process executed by the lane boundary line information acquiring device according to a third exemplary embodiment of the present invention.

FIG. 6 is a flow chart showing the lane boundary line probability information storing process executed by the lane boundary line information acquiring device according to the third exemplary embodiment.

1. Structure of the Lane Boundary Line Information Acquiring Device 1 According to the Third Exemplary Embodiment The lane boundary line information acquiring device 1 according to the third exemplary embodiment has the same structure of the lane boundary line information acquiring device 1 according to the first exemplary embodiment. Accordingly, the explanation of the structure of the lane boundary line information acquiring device 1 according to the third exemplary embodiment is omitted here.

2. Lane Boundary Line Probability Information Storing Process Performed by the Lane Boundary Line Information Acquiring Device 1 According to the Third Exemplary Embodiment The lane boundary line probability information storing process executed by the lane boundary line information acquiring device 1 according to the third exemplary embodiment is basically the same of that of the lane boundary line information acquiring device 1 according to the first exemplary embodiment. The difference between the third exemplary embodiment and the first exemplary embodiment will be explained.

In the lane boundary line probability information storing process executed by the lane boundary line information acquiring device 1 according to the third exemplary embodiment, the lane boundary line probability information acquiring unit 9 acquires new lane boundary line probability information (step S631) by the following process.

In step S631 shown in FIG. 6, the lane boundary line probability information acquiring unit 9 updates the probabilities Pe, Pt1, Pt2 and Pt3 on the basis of the detection result obtained in step S2 by using the following equations (11) to (18):

$$Pe = Pe + m*b \quad (11),$$

$$Pe = Pe - m*b \quad (12),$$

$$Pt1 = Pt1 + m*b \quad (13),$$

$$Pt1 = Pt1 - m*b \quad (14),$$

$$Pt2 = Pt2 + m*b \quad (15),$$

$$Pt2 = Pt2 - m*b \quad (16),$$

$$Pt3 = Pt3 + m*b \quad (17), \text{ and}$$

$$Pt3 = Pt3 - m*b \quad (18),$$

wherein reference character m indicates a variable which is determined on the basis of the weather at the current location of the own vehicle, and a reference character b indicates a base probability varying width which is a constant value. For example, when the weather is cloudy, m=2, when fine, m=1, and when rain, m=0.

That is, if the lane boundary line has been detected in step S2, the lane boundary line probability information acquiring unit 9 updates the probability Pe in step S631 by using the equation (11). On the other hand, if the lane boundary line was not detected in step S2, the lane boundary line probability information acquiring unit 9 updates the probability Pe in step S631 by using the equation (12).

When a solid lane boundary line has been detected in step S2, the lane boundary line probability information acquiring unit 9 updates the probability Pt1 in step S631 by using the equation (13). On the other hand, if no solid lane boundary line was detected in step S2, the lane boundary line probability information acquiring unit 9 updates the probability Pt1 in step S631 by using the equation (14).

Further, if a dotted lane boundary line has been detected in step S2, the lane boundary line probability information acquiring unit 9 updates the probability Pt2 in step S631 by using the equation (15). On the other hand, if no dotted lane boundary line was detected in step S2, the lane boundary line probability information acquiring unit 9 updates the probability Pt2 in step S631 by using the equation (16).

Still further, if a mixed lane boundary line has been detected in step S2, the lane boundary line probability information acquiring unit 9 updates the probability Pt3 in step S631 by using the equation (17). On the other hand, if no mixed lane boundary line was detected in step S2, the lane boundary line probability information acquiring unit 9 updates the probability Pt3 in step S631 by using the equation (18).

3. Reliability Calculation Process Executed by the Lane Boundary Line Information Acquiring Device 1 According to the Third Exemplary Embodiment The lane boundary line information acquiring device 1 according to the third exemplary embodiment executes the same process regarding the reliability calculation process performed by the lane boundary line information acquiring device 1 according to the first exemplary embodiment. Therefore the explanation of the process is omitted here.

4. Effects Provided by the Lane Boundary Line Information Acquiring Device 1 According to the Third Exemplary Embodiment In addition to the effects (1A) to (1D) of the lane boundary line information acquiring device 1 according to the first exemplary embodiment previously described, the lane boundary line information acquiring device 1 according to the third exemplary embodiment has the following effects. That is, the variable m in each of the equations (11) to (18) varies due to the three weather states such as cloudy, fine and rain. The lane boundary line probability information are updated while considering the three weather states such as cloudy, fine and rain, it is possible to obtain the correct lane boundary line probability information with high accuracy.

Fourth Exemplary Embodiment

A description will be given of the lane boundary line information acquiring device 1 according to a fourth exemplary embodiment with reference to FIG. 7.

FIG. 7 is a flow chart showing the lane boundary line probability information storing process executed by the lane boundary line information acquiring device according to the fourth exemplary embodiment.

1. Structure of the Lane Boundary Line Information Acquiring Device 1 According to the Fourth Exemplary Embodiment The lane boundary line information acquiring device 1 according to the fourth exemplary embodiment has the same structure as the lane boundary line information acquiring device 1 according to the first exemplary embodiment. Accordingly, the explanation of the structure of the lane boundary line information acquiring device 1 according to the fourth exemplary embodiment is omitted here.

2. Lane Boundary Line Probability Information Storing Process Performed by the Lane Boundary Line Information Acquiring Device 1 According to the Fourth Exemplary Embodiment The lane boundary line probability information storing process executed by the lane boundary line information acquiring device 1 according to the fourth exemplary embodiment is basically the same of that of the lane boundary line information acquiring device 1 according to the first exemplary embodiment. The difference between the fourth exemplary embodiment and the first exemplary embodiment will be explained.

In the lane boundary line probability information storing process executed by the lane boundary line information acquiring device 1 according to the fourth exemplary embodiment, the lane boundary line probability information acquiring unit 9 acquires new lane boundary line probability information (in step S6) by the following process. Step 6 consists of step S61, step S62 and step S632 as shown in FIG. 7.

In step S62, the lane boundary line probability information acquiring unit 9 does not update the lane boundary line probability information, i.e. the probability Pe, the probability Pt1, the probability Pt2, and the probability Pt3 when the detection result in step S3 indicates the weather at the current location of the own vehicle is rain ("YES" in step S61). That is, the lane boundary line probability information acquiring unit 9 uses the past data as new probabilities Pe, Pt1, Pt2 and Pt3, i.e. the probability Pe, the probability Pt1, the probability Pt2, and the probability Pt3 which has been red-out in step S5.

On the other hand, if the weather at the current location of the own vehicle obtained in step S3 was not rain ("NO" in step S61), the lane boundary line probability information acquiring unit 9 updates the lane boundary line probability information by the following process in step S632.

In step S632, when the lane boundary line is detected in step S2, the lane boundary line probability information acquiring unit 9 updates the probability Pe by using the equation (19). On the other hand, when the lane boundary line is not detected in step S2, the lane boundary line probability information acquiring unit 9 updates the probability Pe by using the equation (20).

The equations (19) to (26) are as follows:

$$Pe=1 \quad (19),$$

$$Pe=0 \quad (20),$$

$$Pt1=1 \quad (21),$$

$$Pt1=0 \quad (22),$$

$$Pt2=1 \quad (23),$$

$$Pt2=0 \quad (24),$$

$$Pt3=1 \quad (25), \text{ and}$$

$$Pt3=0 \quad (26).$$

When a solid lane boundary line has been detected in step S2, the lane boundary line probability information acquiring unit 9 updates the probability Pt1 by using the equation (21). On the other hand, if no solid lane boundary line was detected in step S2, the lane boundary line probability information acquiring unit 9 updates the probability Pt1 by using the equation (22).

Further, if a dotted lane boundary line has been detected in step S2, the lane boundary line probability information acquiring unit 9 updates the probability Pt2 by using the equation (23). On the other hand, if no dotted lane boundary line was detected in step S2, the lane boundary line probability information acquiring unit 9 updates the probability Pt2 by using the equation (24).

Still further, if a mixed lane boundary line has been detected in step S2, the lane boundary line probability information acquiring unit 9 updates the probability Pt3 by using the equation (25). On the other hand, if no mixed lane boundary line was detected in step S2, the lane boundary line probability information acquiring unit 9 updates the probability Pt3 by using the equation (26).

3. Reliability Calculation Process Executed by the Lane Boundary Line Information Acquiring Device 1 According to the Fourth Exemplary Embodiment The lane boundary line information acquiring device 1 according to the fourth exemplary embodiment executes the same process regarding the reliability calculation process performed by the lane boundary line information acquiring device 1 according to the first exemplary embodiment. Therefore the explanation of the process is omitted here.

4. Effects Provided by the Lane Boundary Line Information Acquiring Device 1 According to the Fourth Exemplary Embodiment In addition to the effects (1A) and (1D) of the lane boundary line information acquiring device 1 according to the first exemplary embodiment previously described, the lane boundary line information acquiring device 1 according to the fourth exemplary embodiment has the following effects (4A) and (4B).

(4A) When updating the lane boundary line probability information, the lane boundary line information acquiring device 1 according to the fourth exemplary embodiment switches the type to update the lane boundary line probability information in accordance with the driving environment of the road way on which the own vehicle drives. That is, when the driving environment reduces the reliability of the detection result of the lane boundary line obtained by the lane boundary line detection unit 3 (for example, when the weather is rain), the lane boundary line information acquiring device 1 does not update the probability Pe, the probability Pt1, the probability Pt2 and the probability Pt3 contained in the lane boundary line probability information. For this reason, it is possible to suppress occurrence of unnecessary updating of the lane boundary line probability information.

(4B) When the lane boundary line information acquiring device 1 acquires the new lane boundary line probability information when the weather at the current location of the own vehicle is not rain, it is not necessary for the lane boundary line information acquiring device 1 to update the lane boundary line probability information by using the past lane boundary line probability information. This makes it possible for the lane boundary line information acquiring device 1 to perform the process of acquiring the new lane boundary line probability information more easily.

<Other Modifications>

(1) It is possible for the driving environment to contain other information such as an acceleration speed of the own vehicle (in particular, a lateral acceleration speed of the own vehicle) and a yaw rate of the own vehicle in addition to the weather at the current location of the own vehicle, and the steering angle speed. Still further, it is possible for the driving environment to contain an acceleration speed of the own vehicle (in particular, a lateral acceleration speed of the own vehicle) and a yaw rate of the own vehicle, instead of using one or both the weather information and the steering angle speed. These acceleration speed and the yaw rate are examples of the vehicle states.

In a case in which the lane boundary line information acquiring device 1 uses the acceleration speed as the driving environment, it is possible not to update the lane boundary line probability information in step S6 when the acceleration speed of the own vehicle is not less than a predetermined threshold value, but to update the lane boundary line probability information by using the equations (1) to (8) or the equations (11) to (18) when the acceleration speed of the own vehicle is less than the predetermined threshold value. The acceleration of not less than the predetermined threshold value is one example of the driving environment which may reduce the reliability of the detection result of the lane boundary line in step S2.

Still further, in a case in which the lane boundary line information acquiring device 1 uses the yaw rate as the driving environment, it is possible not to update the lane boundary line probability information in step S6 when the yaw rate of the own vehicle is not less than a predetermined threshold value, but to update the lane boundary line probability information by using the equations (1) to (8) or the equations (11) to (18) when the yaw rate of the own vehicle is less than the predetermined threshold value. The yaw rate of not less than the predetermined threshold value is one example of the driving environment to reduce the reliability of the detection result of the lane boundary line in step S2.

(2) It is possible for the lane boundary line information acquiring device 1 according to each of the first to fourth exemplary embodiments to use as the memory section 29 a memory unit in a cloud computer arranged outside of the own vehicle. This structure makes it possible for the lane boundary line information acquiring device 1 to communicate with the external cloud computer to store and read out the lane boundary line probability information.

When the memory section 29 is a memory unit in the cloud computer arranged outside of the own vehicle, other vehicles of the own vehicle store the lane boundary line probability information associated with the position information of oneself to the memory section 29. In this case, it is possible for the lane boundary line information acquiring device 1 to read out the lane boundary line probability information which has been stored in the memory section 29 by other vehicles, and to use the readout information in the reliability calculation process.

Still further, the lane boundary line information acquiring device 1 of the own vehicle reads outs the lane boundary line probability information of other vehicles which has been stored in the memory section 29. The lane boundary line information acquiring device 1 of the own vehicle updates the lane boundary line probability information red-out from the memory section 29, and can store the updated information into the memory section 29.

(3) It is possible to use the variable m within a range of more than 0 and less than 1 when the weather at the current location of the own vehicle is rain.

(4) It is possible for the lane boundary line information acquiring device 1 according to each of the first to fourth exemplary embodiments to use the lane boundary line probability information which contain the probability Pe, but not contain the probabilities Pt1, Pt2 and Pt3. In this case, it is possible for the lane boundary line information acquiring device 1 to determine whether or not executing the lane keeping control on the basis of the probability Pe only. For example, the lane boundary line information acquiring device 1 starts or continue the execution of the lane keeping control when the probability Pe is not less than the predetermined threshold value. Further, the lane boundary line information acquiring device 1 stops the execution of the lane keeping control when the probability Pe is less than the predetermined threshold value.

Further, it is acceptable for the lane boundary line probability information to contain some or all of the probabilities Pt1, Pt2 and Pt3 without containing the probability Pe. In this case, it is possible for the lane boundary line information acquiring device 1 to calculate the degree C. (I') of reliability of a lane boundary line at a forward position on the basis of some or all of the probabilities Pt1, Pt2 and Pt3 contained in the lane boundary line probability information at the forward position I' in front of the own vehicle, and determine whether or not executing the lane keeping control on the basis of the degree C. (I') of reliability at the forward position I'.

(5) It is possible for the lane boundary line information acquiring device 1 according to the fourth exemplary embodiment to calculate the probability Pe, the probability Pt1, the probability Pt2, and the probability Pt3 on the basis of the detection result of the lane boundary line detection unit 3 and the driving environment at the current location of the own vehicle without using the past lane boundary line probability information when the weather at the current location of the own vehicle is rain.

(6) It is possible for the own vehicle to be equipped with the function of automatic driving. In this case, it is possible for the lane boundary line information acquiring device 1 to start or continue the execution of automatic driving when detection result in step S15 indicates that the degree C. (I') of reliability at the forward position I' is more than the predetermined threshold value, and stop the execution of automatic driving when detection result in step S15 indicates that the degree C. (I') of reliability at the forward position I' is not more than the predetermined threshold value.

It is possible for the own vehicle to be equipped with the function of lane departure warning. In this case, it is possible for the lane boundary line information acquiring device 1 to start or continue issuing the lane departure warning when detection result in step S15 indicates that the degree C. (I') of reliability of a lane boundary line at the forward position I' is more than the predetermined threshold value, and stop issuing the lane departure warning when detection result in step S15 indicates that the degree C. (I') of reliability of a lane boundary line at the forward position I' is not more than the predetermined threshold value.

(7) It is possible to combine or separate the functions of the lane boundary line information acquiring device 1 according to the first to fourth exemplary embodiments. In addition, it is possible to replace with a known component at least a part of the components in the lane boundary line information acquiring device 1 according to the first to fourth exemplary embodiments. It is possible to eliminate a part of the components in the lane boundary line information acquiring device 1 according to the first to fourth exemplary embodiments. Still further, it is possible to add a part of the components in the components in the lane boundary line information acquiring device 1 to another lane boundary line information acquiring device 1.

(8) It is also possible to realize the function of the lane boundary line information acquiring device 1 according to the first to fourth exemplary embodiments by using one or more programs to be processed by the computer system. Further, it is also possible to use a method of performing the function of the lane boundary line information acquiring device 1 according to the first to fourth exemplary embodiments.

While specific embodiments of the present invention have been described in detail, it will be appreciated by those skilled in the art that various modifications and alternatives to those details could be developed in light of the overall teachings of the disclosure. Accordingly, the particular arrangements disclosed are meant to be illustrative only and not limited to the scope of the present invention which is to be given the full breadth of the following claims and all equivalents thereof.

What is claimed is:

1. A lane boundary line information acquiring device comprising:
   a lane boundary line detection unit capable of detecting lane boundary lines;
   a driving environment acquiring unit capable of acquiring a driving environment of an own vehicle;
   a lane boundary line probability information acquiring unit capable of acquiring lane boundary line probability information containing a probability of presence of a lane boundary line or a probability of a detected lane boundary line being a specific type of lane boundary line on the basis of the detection results of the lane boundary line detection unit and the driving environment acquired by the driving environment acquiring unit, the lane boundary line probability information containing a probability of the lane boundary line being one of not less than two specific types of lane boundary lines;
   a position information acquiring unit capable of acquiring position information of the own vehicle;
   a memory unit capable of associating the lane boundary line probability information with the position information of the own vehicle, where the position information of the own vehicle is acquired by the position information acquiring unit at a time when the lane boundary line probability information acquiring unit acquires the lane boundary line probability information, and storing the lane boundary line probability information associated with the position information of the own vehicle into the memory unit;
   a readout unit capable of reading out the lane boundary line probability information associated with the position information at a location in front of the own vehicle;
   a reliability calculation unit capable of calculating a degree of reliability of the lane boundary line on the basis of the lane boundary line probability information read-out by the readout unit;
   a vehicle control unit capable of performing a vehicle control of the own vehicle on the basis of a degree of reliability of the lane boundary line.

2. The lane boundary line information acquiring device according to claim 1, wherein the driving environment is at least one of weather and a vehicle state of the own vehicle.

3. The lane boundary line information acquiring device according to claim 2, wherein the vehicle state of the own vehicle is at least one of a steering angle speed, an acceleration speed and a yaw rate of the own vehicle.

4. The lane boundary line information acquiring device according to claim 2, wherein the lane boundary line probability information acquiring unit reads out a past lane boundary line probability information associated with the position information of the own vehicle from the memory unit, and updates the past lane boundary line probability information, in order to acquire updated lane boundary line probability information, on the basis of the detection result of the lane boundary line detection unit and the driving environment acquired by the driving environment acquiring unit.

5. The lane boundary line information acquiring device according to claim 1, wherein the lane boundary line probability information acquiring unit reads out a past lane boundary line probability information associated with the position information of the own vehicle from the memory unit, and updates the past lane boundary line probability information, in order to acquire updated lane boundary line probability information, on the basis of the detection result of the lane boundary line detection unit and the driving environment acquired by the driving environment acquiring unit.

6. The lane boundary line information acquiring device according to claim 1, wherein the vehicle control of the own vehicle is one of a starting, a continuing or a stopping of a lane keeping control of the own vehicle.

* * * * *